United States Patent
Li et al.

(10) Patent No.: US 10,432,505 B2
(45) Date of Patent: **\*Oct. 1, 2019**

(54) SYSTEMS, APPARATUSES, AND METHODS FOR REROUTING NETWORK TRAFFIC

(71) Applicant: Coriant Operations, Inc., Naperville, IL (US)

(72) Inventors: Yufeng Li, Shanghai (CN); Eric L. Chan, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,463

(22) Filed: Feb. 15, 2018

(65) Prior Publication Data

US 2018/0176125 A1    Jun. 21, 2018

Related U.S. Application Data

(63) Continuation of application No. 14/140,813, filed on Dec. 26, 2013, now Pat. No. 9,929,939.

(51) Int. Cl.
*H04L 12/707* (2013.01)
*H04L 12/703* (2013.01)

(52) U.S. Cl.
CPC .............. *H04L 45/22* (2013.01); *H04L 45/28* (2013.01)

(58) Field of Classification Search
None
See application file for complete search history.

(56) References Cited

U.S. PATENT DOCUMENTS

| | | |
|---|---|---|
| 5,317,742 A | 5/1994 | Bapat |
| 5,435,004 A | 7/1995 | Cox et al. |
| 5,442,791 A | 8/1995 | Wrabetz et al. |
| 5,724,424 A | 3/1998 | Gifford |
| 5,805,602 A | 9/1998 | Cloutier et al. |
| 5,920,705 A | 7/1999 | Lyon et al. |
| 6,044,367 A | 3/2000 | Wolff |
| 6,061,735 A | 5/2000 | Rogers |
| 6,067,545 A | 5/2000 | Wolff |
| 6,094,437 A | 7/2000 | Loehndorf, Jr. et al. |
| 6,101,508 A | 8/2000 | Wolff |
| 6,185,601 B1 | 2/2001 | Wolff |
| 6,542,934 B1 | 4/2003 | Bader et al. |

(Continued)

OTHER PUBLICATIONS

Internet Engineering Task Force, Request for Comments 2205, Resource ReSerVation Protocol (RSVP)—Version 1 Functional Specification, Sep. 1997.

(Continued)

*Primary Examiner* — Kent K Krueger
(74) *Attorney, Agent, or Firm* — Merchant & Gould P.C.

(57) ABSTRACT

A network element includes a processor that is configured to receive a request for performing an administratively-requested reroute (ARR) on a network. The ARR includes at least a first data plane operation on the network element and a second data plane operation on another network element. The network element is also configured to determine whether it is capable of performing the first data plane operation without interrupting network traffic on that network element. The network element is further configured to determine whether the other network element is capable of performing the second data plane operation without interrupting network traffic on that network element.

20 Claims, 6 Drawing Sheets

(56) References Cited

U.S. PATENT DOCUMENTS

| | | |
|---|---|---|
| 6,601,084 B1 | 7/2003 | Bhaskaran et al. |
| 6,611,872 B1 | 8/2003 | McCanne |
| 6,782,550 B1 | 8/2004 | Cao |
| 6,785,704 B1 | 8/2004 | McCanne |
| 6,802,020 B1 | 10/2004 | Smith |
| 6,886,035 B2 | 4/2005 | Wolff |
| 6,892,083 B2 | 5/2005 | Shostak |
| 7,046,665 B1 | 5/2006 | Walrand et al. |
| 7,079,857 B2 | 7/2006 | Maggenti et al. |
| 7,230,924 B2 | 6/2007 | Chiu et al. |
| 7,254,636 B1 | 8/2007 | O'Toole, Jr. et al. |
| 7,296,091 B1 | 11/2007 | Dutta et al. |
| 7,313,095 B1 | 12/2007 | Nucci et al. |
| 7,406,032 B2 | 7/2008 | Li et al. |
| 7,409,712 B1 | 8/2008 | Brooks et al. |
| 7,457,233 B1 | 11/2008 | Gan et al. |
| 7,551,551 B2 | 6/2009 | Filsfils et al. |
| 7,584,298 B2 | 9/2009 | Klinker et al. |
| 7,602,702 B1 | 10/2009 | Aggarwal |
| 7,711,788 B2 | 5/2010 | Lev Ran et al. |
| 7,808,918 B2 | 10/2010 | Bugenhagen |
| 7,895,445 B1 | 2/2011 | Albanese et al. |
| 8,233,905 B2 | 7/2012 | Vaswani et al. |
| 2003/0046426 A1 | 3/2003 | Nguyen |
| 2003/0133459 A1 | 7/2003 | Siddiqui et al. |
| 2006/0056411 A1 | 3/2006 | Badat et al. |
| 2007/0233857 A1 | 10/2007 | Cheng et al. |
| 2009/0238074 A1 | 9/2009 | Vasseur et al. |
| 2010/0080244 A1 | 4/2010 | Staehling et al. |
| 2011/0063979 A1 | 3/2011 | Matthews et al. |
| 2013/0152187 A1 | 6/2013 | Strebe et al. |
| 2013/0329548 A1 | 12/2013 | Nakil et al. |
| 2013/0336191 A1 | 12/2013 | Zhao et al. |
| 2014/0355419 A1 | 12/2014 | Pillai |
| 2015/0043383 A1 | 2/2015 | Farkas et al. |
| 2016/0365897 A1 | 12/2016 | Gross et al. |

OTHER PUBLICATIONS

Internet Engineering Task Force, Request for Comments 3209, RSVP-TE: Extensions to RSVP for LSP Tunnels, Dec. 2001.
Internet Engineering Task Force, Request for Comments: 5151, Inter-Domain MPLS and GMPLS Traffic Engineering—Resource Reservation Protocol—Traffic Engineering (RSVP-TE) Extensions, Feb. 2008.
Li, G. et al (RSVP-TE Extensions for Shared-Mesh Restoration in Transport Networks—draft-li-shared-mesh-restoration-01.txt), Nov. 2001, Internet Engineering Task Force, 1-18.

SYSTEMS, APPARATUSES, AND METHODS FOR REROUTING NETWORK TRAFFIC

CROSS-REFERENCE TO RELATED APPLICATION

This application is a continuation of U.S. patent application Ser. No. 14/140,813 filed on Dec. 26, 2013, now U.S. Pat. No. 9,929,939, issued on Mar. 27, 2018, entitled "SYSTEMS, APPARATUSES, AND METHODS FOR REROUTING NETWORK TRAFFIC", the entire content of which is hereby incorporated by reference as if set forth fully herein.

BACKGROUND

Field

Example aspects described herein relate generally to routing data on a network, and, more specifically, to rerouting network traffic based on capabilities of network elements involved in the rerouting of that traffic.

Related Art

Optical networks contain various network elements that are capable of sending and transmitting data, thereby allowing for communications on the network (referred to herein as "network traffic"). Network elements on an optical network can include components such as, for example, switch nodes, edge nodes, transport systems, network managers, and optical network terminals. These network elements can be communicatively coupled to each other, such that each network element is coupled to at least one other network element. Network traffic can be distributed among the network elements in various ways, with main hubs of network traffic being referred to as "nodes," and the coupling between nodes being referred to as "links" or "legs."

Typically, communications on an optical network are enabled by the "control planes" and "data planes" of the network elements. The control plane (CP) has the architectures and protocols used to define network topologies (e.g., sets of links between the network elements of the optical network) and facilitate data transmission (e.g., signaling, routing, network and addressing) and traffic engineering. Examples of control planes include time-division multiplexing (TDM) control planes and Internet Protocol (IP) control planes. The data plane, also referred to as the "forwarding plane" or "transport plane," contains the architectures and protocols used to transfer data from one location on the network to another via the connections of network elements (e.g., links). Accordingly, network traffic can include information that is used by the control plane and information that is used by the data plane, for enabling the network elements to route and send the communications contained in the network traffic.

From time to time, interruptions in network service may occur, such that the capability to transfer data on one or more links of the network may be lost. Service interruptions, often referred to as "faults," may occur when, for example, there is a problem in a link (e.g., a physical connection in a link may be disrupted, or a link may be overloaded with data). When there is a fault, network service may be restored by rerouting network connections to remove, avoid, or obviate the fault. Service restoration typically is guided by operations in the control plane. Specifically, during the rerouting process, the control plane can compute a new path in the network to avoid the fault based on existing network topologies. After computing a new path, the control plane performs re-signaling operations to reconfigure resources in the data plane to restore the network service(s).

Rerouting of network service may be initiated by a user (e.g., a network administrator), even in the absence of a fault. A user-initiated reroute may occur when, for example, a network administrator determines to disable or bypass a network link. A user-initiated reroute can be referred to as an "administratively-requested reroute," or ARR. An ARR can be executed, for example, to reroute one specific CP call off of a network link, or to reroute all CP calls off of a network link, whether or not there is a fault on the link. The purpose of an ARR may be, for example, to isolate a network element from network service in order to perform maintenance, or to remove a network element from the network.

An ARR can impact the performance of the network because rerouting may introduce network traffic interruptions. For example, an ARR may cause one or more processes being performed by a particular network element to cease sending data to another network element, and begin sending the data to another network element. The network element, however, may not have the capability to switch paths without interrupting network service at that element in order to reconfigure at the data plane. In other words, the network element might be unable to perform hitless data plane operations to switch from a faulted path to a new path. Moreover, until the ARR is carried out, the user initiating it may not know whether the network elements involved have the hitless data plane operation capability necessary to switch connections without interrupting service. These issues are compounded when an ARR involves multiple network elements and links.

ARRs thus can impact network performance in way that affects a significant number of customers. This can make customers unhappy with the network performance and, in turn, unhappy with network administration. ARRs can further affect the network administration and customers because traffic-impacting events can be measuring factor or benchmark in service level agreements (SLA) that network customers have with the network carrier.

SUMMARY

The above and other limitations can be overcome by network elements, systems, methods, and non-transitory computer-readable storage media described herein.

According to one aspect, a network element comprises a processor, and the network element is configured to receive a request for performing an administratively-requested reroute (ARR) on a network. The ARR includes at least a first data plane operation on the network element and a second data plane operation on another network element. The network element is also configured to determine whether the network element is capable of performing the first data plane operation without interrupting network traffic on the network element. The network element is also configured to determine whether the other network element is capable of performing the second data plane operation without interrupting network traffic on that network element.

According to another aspect, a network element comprises a processor, and the network element is configured to generate a request for performing an administratively-requested reroute (ARR) on a network. The ARR includes at least a first data plane operation on a first network element and a second data plane operation on a second network element. The network element is also configured to transmit the request to the first network element. The request includes hitless ARR data, which indicates that data plane operations in the ARR are to be performed without interrupting network traffic.

According to another aspect, a system comprises a first network element on a network and a second network element on the network. The first network element is configured to generate a request for performing an administratively-requested reroute (ARR) on the network. The ARR includes at least a data plane operation on the second network element and a data plane operation on a third network element on the network. The request includes hitless ARR data, the hitless ARR data indicating that data plane operations in the ARR be performed without interrupting network traffic. The first network element is also configured to transmit the request to the second network element. The second network element is configured to receive the request and determine whether the second and third network elements are capable of performing their respective data plane operations without interrupting network traffic on the respective network element.

According to another aspect, a method includes receiving, at a network element, a request for performing an administratively-requested reroute (ARR) on a network, the ARR including at least a first data plane operation on the network element and a second data plane operation on a further network element. The method also includes determining, at the network element, whether the network element is capable of performing the first data plane operation without interrupting network traffic on the network element. The method further includes determining, at the network element, whether the further network element is capable of performing the second data plane operation without interrupting network traffic on that network element.

According to another aspect, a method includes generating, at a network element, a request for performing an administratively-requested reroute (ARR) on a network, the ARR including at least a first data plane operation on a first further network element and a second data plane operation on a second further network element. The method also includes transmitting the request to the first further network element. The request includes hitless ARR data, and the hitless ARR data indicates that data plane operations in the ARR are to be performed without interrupting network traffic.

According to another aspect, a non-transitory computer-readable storage medium contains a computer program having instructions which, when executed by a computer, cause the computer to carry out a method for processing a request for an administratively-requested reroute (ARR). The method comprises receiving a request for performing an administratively-requested reroute (ARR) on a network. The ARR includes at least a first data plane operation on the network element and a second data plane operation on another network element. The method also comprises determining whether the network element is capable of performing the first data plane operation without interrupting network traffic on the network element. The method also comprises determining whether the other network element is capable of performing the second data plane operation without interrupting network traffic on that network element.

According to another aspect, a non-transitory computer-readable storage medium contains a computer program having instructions which, when executed by a computer, cause the computer to carry out a method for requesting the performance of an administratively-requested reroute (ARR). The method comprises generating a request for performing an ARR on a network. The ARR includes at least a first data plane operation on a first network element and a second data plane operation on a second network element. The request includes hitless ARR data, which indicates that data plane operations in the ARR are to be performed without interrupting network traffic. The method also comprises transmitting the request to the first network element.

BRIEF DESCRIPTION OF THE DRAWINGS

The features and advantages of the example embodiments presented herein will become more apparent from the detailed description set forth below when taken in conjunction with the drawings. Like reference numbers between two or more drawings can denote identical or functionally similar elements unless the description indicates otherwise.

DETAILED DESCRIPTION

Figure 1:
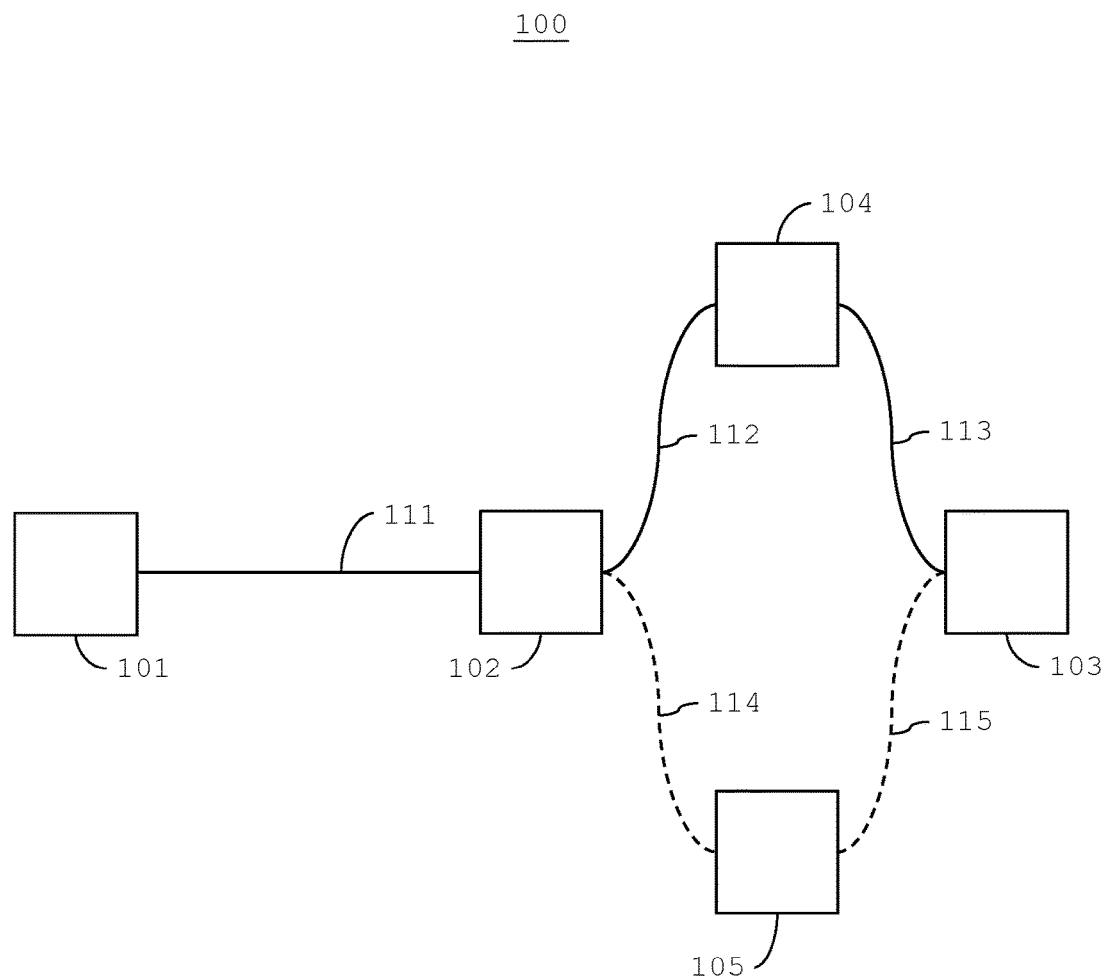
FIG. 1 shows an example optical network.

FIG. 1 shows an example optical network in which example embodiments described herein may be configured and/or be deployed. Optical network 100 can be, for example, an automatically-switched optical network (ASON) that employs synchronous optical networking (SONET) and/or synchronous digital hierarchy (SDH) protocols to transfer data, although example embodiments are not limited for use only with such a network and protocols. Optical network 100 may be a subnetwork (or "subnet") of a larger network (not shown).

Network traffic on optical network 100 can follow traffic engineering protocols such as, for example, the Resource Reservation Protocol (RSVP) defined in the Internet Engineering Task Force (IETF) Request for Comment (RFC) 2205. Network 100 can further support the Resource Reservation Protocol—Traffic Engineering (RSVP-TE) protocol defined in IETF RFCs 3209 and 5151.

Optical network 100 includes nodes 101, 102, 103, 104 and 105. The nodes of network 100 may be any suitable type of node (e.g., add-drop, optical cross-connect (OXC), switch, or edge, etc. used in a communications network). Each node in network 100 includes one or more network elements. In turn, each network element can include, for example, one or more of the following components: an optical transport system (OTS), an optical transmitter, an optical line amplifier (OLA), an add-drop multiplexer (ADM), an optical hub, an optical switch, a router, a network management system, an element management system, a network planning system, and/or a network terminal, although these examples are not limiting. As used herein, the term "node" can refer to the network element(s) of the node and/or any components of such network element(s). Each node in optical network 100 may include, in the control plane, a node entity capable of modeling connectivity between links. Each node entity may include hardware and/or software needed for such capability, including, for example, a switching matrix.

In optical network 100, nodes 101 and 102 are communicatively coupled by link 111, nodes 102 and 104 are communicatively coupled by link 112, and nodes 104 and 103 are communicatively coupled by link 113. Thus, node 102 and 103 can be said to be communicatively coupled by a path that includes links 112 and 113 and node 104.

Nodes 102 and 103 also may be configured (as represented by the dashed line) to be communicatively coupled by an alternative path that includes links 114 and 115 and node 105. So, for example, network traffic traveling between nodes 102 and 103 may be configured to travel on a path that includes links 112 and 113 or a path that includes links 114 and 115.

The links and/or nodes of network 100 can optionally include intermediate components (not shown) (e.g., one or more network elements, nodes, networks and/or sub-networks). Similarly, nodes 101, 102, 103, 104, and/or 105 optionally can be communicatively coupled to other nodes and/or components (not shown), such as any of the optional intermediate components listed above, by links (also not shown) including and/or other than those illustrated in FIG. 1.

In the configuration of optical network 100, nodes 101 and 102 are the "source" and "destination" nodes, respectively, for network traffic that travels from node 101 to 102 via link 111 (and the destination and source nodes, respectively, for network traffic that travels in the opposite direction). Likewise, nodes 102 and 103 are the source and destination nodes, respectively, for network traffic that travels from node 102 to 103 via links 112 and 113 (and the destination and source nodes, respectively, for network traffic that travels in the opposite direction). From the perspective of network traffic service established by the control plane of network 100, the origination node is where traffic originates, and the termination node is where such traffic terminates.

The direction in which network traffic travels is referred to as "downstream," with the opposite direction being referred to as "upstream." For example, network traffic that crosses link 111 from source node 101 towards destination node 104 travels downstream from node 101 to node 102. In this example, source node 101 is an upstream node and destination node 102 is a downstream node. Nodes 103 and 104 are also downstream nodes of node 101.

In example embodiments herein, optical network 100 may be configured such that one or more of its nodes includes (or is associated with) one or more network elements that permits a user (e.g., a network administrator) and/or network software to issue commands to other network elements in network 100.

Administratively-Requested Reroutes in an Optical Network

A request for an ARR ("ARR request") can be a network communication that is (or otherwise includes) a request for rerouting one or more network traffic paths. In example embodiments, an ARR request is a request for rerouting one or more CP paths on an optical network (e.g., rerouting traffic paths between nodes on network 100). In these embodiments, the ARR request is initiated at an origination node, which transmits the request via the network to a "rerouting" node. The rerouting node, which also may be referred to as a "repair node," is the source node for the link(s) to be rerouted. In some example embodiments, the origination node and the rerouting node may be the same node, depending on, for example, what link(s) is to be rerouted according to the ARR.

For example, in connection with network 100, node 101 can be an origination node configured to generate an ARR request and transmit that request to the rerouting node (unless node 101 is also the rerouting node). Thus, if an ARR request for the rerouting of link 112 is generated at origination node 101, the node transmits the ARR request via link 111 to rerouting node 102, which is the downstream source node for link 112.

In an example aspect herein, an ARR request can include an instruction to perform the ARR without impacting network traffic. The ARR request can include data for initiating a determination of whether one or more network elements involved in the ARR (e.g., network elements at the source and destination nodes of each link to be rerouted) are capable of using hitless data plane operations to perform the ARR. Such a request is referred to herein as a "hitless ARR request."

A capability to perform a hitless ARR by hitless data plane operations can include, for example, the capability of the node to perform bridge-and-roll (B&R) operations in the data plane of a node. Another example is the capability of a node to perform a hitless conversion from an unprotected cross-connection to a protected cross-connection in the data plane. A node that is capable of such hitless data plane operations thus can be capable of rerouting network traffic without interrupting network service on the node.

Accordingly, example embodiments include one or more nodes on an optical network (e.g., nodes 101, 102, 103, 104, and/or 105) that are configured to perform one or more hitless data plane operations (e.g., B&R operations). These example embodiments also include one or more nodes configured to process an ARR request that includes data for determining whether network elements involved in the ARR are capable of using hitless data plane operations to perform the ARR.

ARR Requests

As discussed above, network traffic on an optical network (e.g., network 100) can follow RSVP and RSVP-TE protocols. In these protocols, downstream-traveling RSVP messages, e.g., "path" (PATH) messages which can be used to signal network resources, and upstream-traveling RSVP messages, e.g., "reserve" (RESV) messages which can be used to reserve network resources, can be used to configure and/or enable network traffic between nodes. PATH and RESV messages include one or more data objects. In example embodiments, an ARR request is a data object in a PATH message. In these embodiments, the PATH message that includes the ARR request data object can be sent downstream from an origination node (e.g., node 101 in an example configuration of network 100) to a routing node (e.g., node 102). Further, an ARR request may be a hitless ARR request, which can be, for example, a reroute data object that is contained in a PATH message and that includes data for determining whether one or more network elements involved in the ARR can perform hitless data plane operations.

Figure 2:
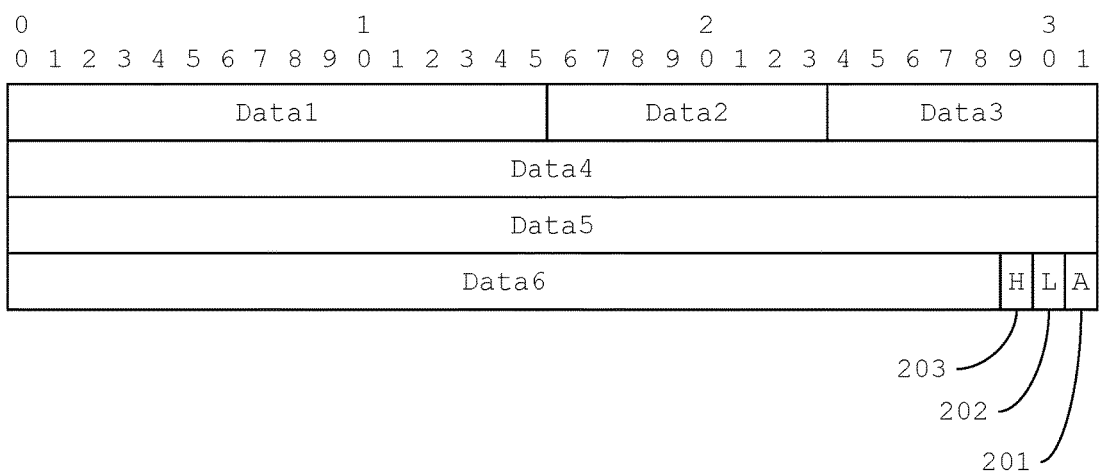
FIG. 2 is a representation of a reroute data object according to an example embodiment herein.

FIG. 2 is a representation of a reroute data object according to an example embodiment herein. The data object shown is made up four rows of bits, each row having 32 bits, although this bit size is simply illustrative and does not limit the bit size of any data object in any example embodiment. Reroute data object 200 can be, for example, a data object included in a PATH message. Reroute data object 200 contains multiple sets of data, including Data1, Data2, Data3, Data4, Data5, and Data6. Some of these data sets include information to permit processing of the data object. For example, Data1 can contain information on the bit length of reroute data object 200, and Data2 can contain information on the class type of the object. Some of the data sets include information for identifying the network connections to be rerouted. For example, Data4 can contain information identifying a network (and/or subnet) for the ARR, and Data5 can contain information identifying nodes involved in the ARR. Furthermore, one or more data sets in reroute data object 200 may include bandwidth and/or signaling information.

Reroute data object 200 also includes one or more data bits that can indicate a specific meaning when the bit is set. Such data bits are referred to as "flags." Flags in the reroute data object include, for example flags 201, 202, and 203. Certain flags in the reroute data object may embody (and/or be defined by) one or more network communications standards, e.g., standards of the IETF, the Optical Internetworking Forum (OIF), and/or the International Telecommunication Union (ITU).

Flag 201, when set, indicates that the reroute identified by the data object is an administratively-requested reroute (hence, the flag is denoted "A" in FIG. 2). Accordingly, reroute data object 200 having flag 201 set is an example of an ARR request.

Flag 202, when set, indicates that the reroute identified by reroute data object 200 is link fault reroute, e.g., an automatic command to restore a link fault (hence, the flag is denoted "L"). This flag may not be set, for example, if reroute data object 200 is an ARR request.

Flag 203, when set, indicates that the reroute identified by reroute data object 200 is to be performed by hitless data plane operations (hence, the flag is denoted "H"). Conversely, when flag 203 is not set, the reroute identified by the reroute is not required by the requestor to be performed by hitless data plane operations. Thus, an example of a request for a hitless ARR request is reroute data object 200 having flags 201 and 203 set and flag 202 not set.

In example embodiments herein, when a rerouting node (e.g., node 102) on an optical network receives a reroute data object (e.g., data object 200), the rerouting node can process the data object. Such processing includes, for example, detecting whether the data object is a hitless ARR request by determining whether the data object contains a flag set to indicate that the reroute is an ARR (e.g., flag 201) and a flag set to indicate that the reroute is to be performed by hitless data plane operations (e.g., flag 203). In these embodiments, if the rerouting node detects a hitless ARR request, it then can determine whether it and/or other nodes involved in the ARR (e.g., a destination node such as node 103 and/or any intermediate nodes such as nodes 104 and 105) are capable of performing one or more hitless data plane operations, and issue notifications and/or commands accordingly. Processing by a rerouting node is discussed below in connection with FIGS. 3, 4, and 5.

However, in example embodiments herein, not all rerouting nodes on an optical network (e.g., optical network 100) may be configured to detect that a data object is a hitless ARR request. For example, a node(s) on the network may be configured such that it is capable of detecting an ARR request but not capable of detecting, for example, a flag set to indicate that the reroute is to be performed by hitless data plane operations. A node so configured nevertheless may process a hitless ARR request (without detecting an instruction such as, for example, a hitless ARR flag).

Procedures on an Optical Network Involving ARR Requests

Figure 3:
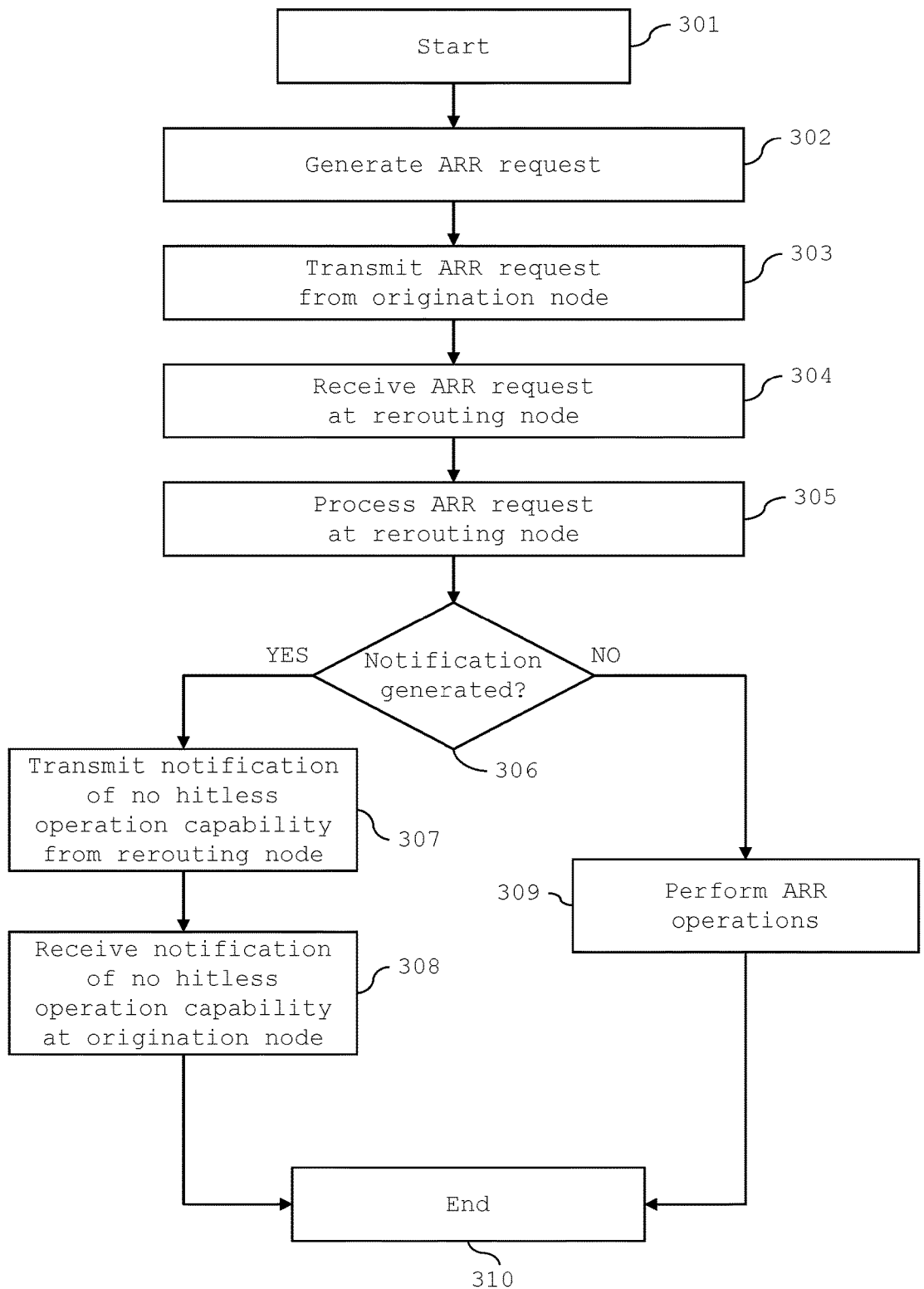
FIG. 3 shows an example procedure for processing an ARR request according to example embodiments herein.

FIG. 3 shows an example procedure for processing an ARR request (e.g., an ARR request and/or a hitless ARR request such as, for example, reroute data object 200 according to example embodiments herein. The procedure begins at block 301 and proceeds to block 302, at which an ARR request is generated. The ARR request can be generated by an origination node (e.g., node 101) on an optical network. In an example embodiment, the ARR request is generated in response to a command received from a data processing system (e.g., system 600) that is communicatively coupled to (or otherwise can communicate with) the origination node. For example, a user (e.g., a network administrator) of the data processing system can issue the command for the ARR via a user interface of the data processing system.

In an example embodiment, the ARR request generated at block 302 includes a data object (e.g., reroute data object 200) for rerouting network traffic at a rerouting node. The data object may include, for example, a flag (e.g., flag 201) indicating the reroute is an ARR. The ARR request generated at block 302 may be a hitless ARR, in which case data object may include an instruction for performing the ARR using hitless data plane operations. For example, the data object may include a flag (e.g., flag 203) set to indicate that the ARR is to be performed using hitless data plane operations. On the other hand, the ARR request generated at block 303 may not be a hitless ARR, in which case the data object may not include such an instruction (e.g., flag 203 is not set).

Prior to the generation of the ARR request at block 302 (but after, for example, issuance of a user command for an ARR), the control plane of the origination node may perform other processing in connection with the generation of the ARR request. For example, the control plane may perform routing calculations and/or other processing on (or in response to) the user command (which may include information in addition to the ARR request).

At block 303, the ARR request is transmitted from the origination node. In example embodiments herein, the origination node (as well as other nodes involved in the procedure of FIG. 3) is a node in an optical network (e.g., network 100) that follows RSVP and RSVP-TE protocols. In these embodiments, transmission at block 303 can include transmitting a reroute data object in a PATH message.

At block 304, the ARR request is received at the rerouting node, and at block 305, the rerouting node processes the ARR request. Processing by the rerouting node at block 305 occurs, in one example, in the control plane of the node and can include, for example, reading and/or parsing data in a data object, and determining what nodes are involved in the ARR.

Figure 4:
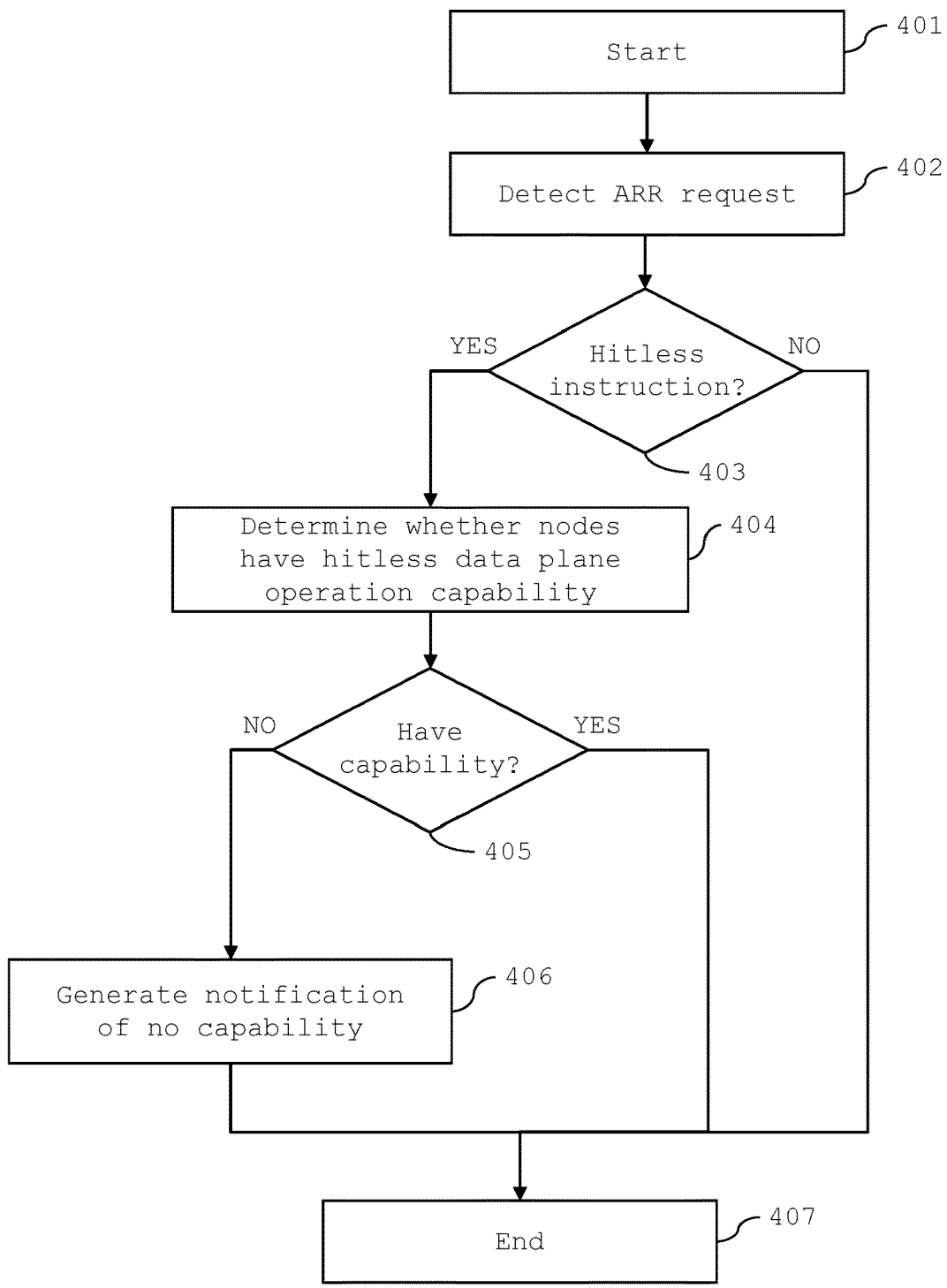
FIG. 4 shows an example procedure for processing a hitless ARR request according to example embodiments herein.

In example embodiments, processing at block 305 includes one or more blocks of the example procedure for processing an ARR request shown in FIG. 4. As discussed in connection with that figure, processing an ARR request can include detecting an instruction for performing the ARR using hitless data plane operations (e.g., detecting a data object flag such as flag 203 in a hitless ARR) and, if such an instruction is detected, determining whether the network elements involved in the ARR have a capability to perform such operations. Such detection and/or determination can be made by, for example, a data processing system such as that shown in FIG. 6. If the instruction for a hitless ARR is detected but it is determined that nodes involved in the ARR lack a capability to perform a hitless ARR, then a notification can be generated. A notification can be generated at block 305 if, for example, a notification request (e.g., data object 500 of FIG. 5) is generated at step 302. In other example embodiments, however, no notification is generated at block 305.

Following processing at block 305, which (depending on a result of the determining) may include the generation of a notification that nodes involved in a requested hitless ARR lack a capability to perform the hitless ARR, decision block 306 is entered.

At decision block 306, if a notification was not generated in block 305, the procedure proceeds to block 309, at which block an ARR can be performed by one or more nodes. Performance of an ARR at block 309 can include, for example, generation of RSVP messages (e.g., PATH and/or RESV), transmission of such messages, performance of routing calculations, reservation of network resources and/or network routes (according to, for example RSVP and RSVP-TE protocols), and signaling at or among nodes. One or more nodes may be involved at block 309, including, for example, an origination node (e.g., node 101), a routing/source node (i.e., node 102), and a destination node (e.g., node 103).

It will be recognized, in view of the discussion of block 305 above and the description of FIG. 4 below that a notification will not be generated in at least two different circumstances. The first circumstance can occur when a rerouting node does not detect an instruction for hitless data plane operations in an ARR request. As discussed above in connection with data object 200, a rerouting node may not detect an instruction when the data object lacks the instruction, or when the control plane of the rerouting node is not configured to (or otherwise capable of) detect the instruction and, in turn, the rerouting node does not process the instruction. Thus, in the first circumstance, the requested ARR can be performed if the ARR is not a hitless ARR or if the rerouting node does not recognize an instruction for a hitless ARR.

The second circumstance in which a notification is not generated at block 305 can occur when a rerouting node detects an instruction for a hitless ARR and also determines that the nodes involved in the hitless ARR have the capability to perform hitless data plane operations (e.g., the capability to perform a hitless ARR). Such detection and/or determination can be made by, for example, a data processing system such as that shown in FIG. 6. Thus, in the second circumstance, a hitless ARR request can be performed when the nodes on the ARR are capable for performing a hitless ARR.

If a notification is generated in block 305, the procedure proceeds to block 307 after decision block 306. At block 307, the rerouting node transmits a notification that nodes involved in the requested ARR do not have capability to perform hitless data plane operations. The notification can be transmitted, for example, for a network management purpose, such as to enable an origination node to perform a process such as command result reporting or logging. In example embodiments, the notification is a data object (such as, for example, data object 500), and transmission at block 307 can include transmitting the data object in an RSVP message. For example, RSVP and RSVP-TE protocol includes certain kinds of "path error" (PATH ERROR) messages that are associated with error codes, and the notification transmitted at block 307 can be such a message.

At block 308, the origination node receives the notification transmitted at block 307. After receipt, the origination node may send the notification (or information regarding the notification, such as an error message) to a data processing system (e.g., system 600) (such sending is not shown in FIG. 3). Specifically, the notification (or information pertaining thereto) can be sent to the data processing system (which may be included with or coupled to, for example, any node of FIG. 1 or another element in an optical network) and provided to a user (e.g., a network administrator) via a user interface. For example, following block 308, a user who requested a hitless ARR may be provided with an error message (and/or other information) that the hitless ARR cannot be performed.

Following blocks 308 and/or 309, the procedure of FIG. 3 ends at block 310.

The procedure in FIG. 3 may permit a user (e.g., a network administrator) to request a hitless ARR. If the instruction for a hitless ARR is detected and can be performed by nodes capable of hitless data plane operations, the ARR can be performed without impacting network traffic. On the other hand, if the instruction is detected but cannot be performed by such nodes, the hitless ARR can be denied (not performed) and the user can be made aware that an ARR may impact network traffic. Accordingly, network administration can be provided with information on how ARRs may affect network traffic (and network customers' service).

By virtue of the procedure shown in FIG. 3, a user can have the ability to selectively choose between requesting a hitless ARR and requesting an ARR that may (although not necessarily will) impact network traffic. Moreover, if a hitless ARR is requested but the user is then informed that a hitless ARR cannot be performed, the user can selectively choose between requesting an ARR that may impact network traffic and not requesting an ARR.

FIG. 4 shows an example procedure for processing a hitless ARR request (e.g., a data object such as object 200) according to example embodiments. This procedure (or blocks thereof) can be used, for example, to process an ARR request received by a node in an optical network (e.g., nodes 101, 102, 103, 104, and/or 105). For example, the procedure shown in FIG. 4 can be employed in the performing (in whole or in part) of block 305 of FIG. 3, which involves the processing of an ARR request, as discussed above. Accordingly, in example embodiments herein, the procedure in FIG. 4 is performed at a rerouting node that receives an ARR request (e.g., node 102).

The procedure of FIG. 4 begins at block 401 and proceeds to block 402, in which an ARR request is detected. Detection of an ARR request can include, for example, detecting one or more flags (e.g., flags 201, 202, and/or 203) in a data object.

At decision block 403, it is decided whether a hitless ARR request has been detected, based on the detection at block 402. A "YES" decision can be returned at block 403 if, for example, an ARR request detected at block 402 contains a request for a hitless ARR. If a "YES" decision is returned at block 403, the procedure continues to block 404. On the other hand, if a "NO" decision is returned, the procedure reaches block 407 and ends.

In example embodiments herein, a "YES" decision is returned at block 403 when an ARR request data object has flags for an ARR and hitless data plane operations set (e.g., flags 201 and 203 of data object 200 are set). Moreover, a "NO" decision is returned at block 403, for example, if the data object does not contain an ARR request (e.g., flag 202 has been set and flag 201 has not been set), if the data object contains an ARR request but does not specify a hitless ARR (e.g., flag 201 has been set and flag 203 has not been set), and/or if the node performing block 402 is not configured to (or otherwise lacks the capability to) detect a hitless ARR request (e.g., the node cannot detect flags 201 and/or 203).

At block 404 it is determined whether one or more nodes involved in the requested hitless ARR are capable of performing hitless data plane operations. In example embodiments, at block 404, a rerouting node (e.g., source node for a reroute, such as node 102) can be configured to determine whether it and the destination node for the reroute (e.g. node 103) can perform hitless data plane operations (e.g., bridge-and-roll operations). In these embodiments, block 404 can include plural determinations (e.g., a determination that the source node is configured to perform hitless data plane operations and a determination whether the destination node is so configured).

Other example embodiments can include additional determinations. For example, the rerouting node further can be configured to determine whether intermediate nodes for the reroute (if any) can perform hitless data plane operations. In turn, block 404 can include, in addition to determinations with respect to the source and destination nodes, determinations with respect to some or all of the intermediate nodes.

A node can be configured to determine whether it and/or other nodes are configured to (or otherwise is capable of) hitless data plane operations based on data stored at (and/or accessible by) the rerouting node. For example, a downstream node can store in its memory data on its own local capabilities, e.g., whether or not it has a hitless capability. Such data can include information on the capabilities and configurations of nodes in the network including, for example, downstream nodes (e.g., destination nodes), upstream nodes, and the rerouting node (e.g., source node) itself. Thus, a rerouting node can store (and/or have access to) not only its own capability to perform hitless data plane operations, but also such capabilities of other nodes.

At decision block 405, it is decided whether one or more nodes involved in the request hitless ARR are capable of performing hitless data plane operations, based on the determination(s) at block 404. If a "NO" decision is returned at block 405, the procedure continues by proceeding to block 406. On the other hand, if a "YES" decision is returned, the procedure proceeds to block 407 and ends.

A "YES" decision can be returned at block 405 if, for example, the source (rerouting) and destination nodes involved in the hitless ARR are each capable of performing hitless data plane operations. Alternatively, where determinations at block 404 are made with respect to intermediate nodes, a "YES" decision can be returned if the source, destination, and any intermediate nodes are capable of hitless data plane operations.

A "NO" decision can be returned at block 405 if, for example, any determination made at block 404 is a determination that a node lacks hitless data plane operations. For example, if block 404 includes determinations with respect to only the source and destination nodes, then block 405 can return a "NO" decision if either (or both) of these nodes lack the necessary capability.

At block 406, a notification that a node (or nodes) lacks a capability to perform hitless data plane operations is generated. The notification, which can be generated by the rerouting node, can include information identifying which node(s) lacks the capability needed to perform the requested hitless ARR. Example notifications are discussed in connection with FIG. 5 below. After block 406, the procedure ends at block 407.

Figure 5:
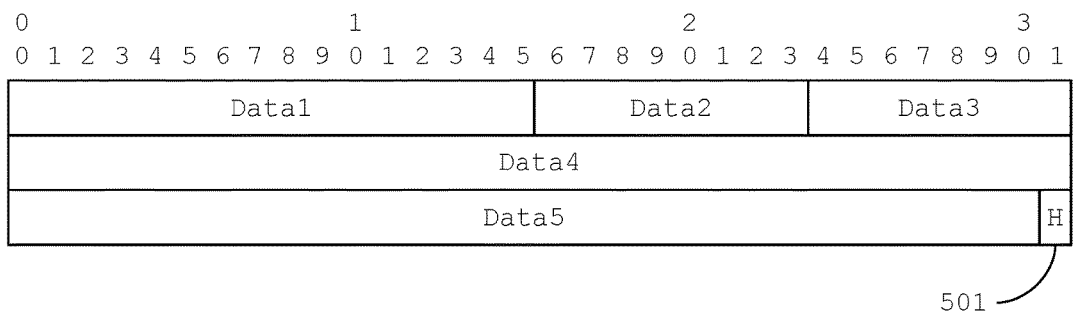
FIG. 5 is a representation of a notification data object according to an example embodiment herein.

FIG. 5 is a representation of a notification request data object according to an example embodiment herein. Notification request data object 500 can be a data object sent with an ARR request in a PATH message. Specifically, the data object 500 can be included with an ARR request to prompt a notification such those discussed above in connection with blocks 307 and 308 of FIG. 3 and block 406 of FIG. 4.

The data object shown in FIG. 5 is made up of three rows of bits, each row having 32 bits, although this bit size is simply illustrative and does not limit the bit size of any data object in any example embodiment. Features of notification request data object 500, such as the types of data contained in data sets Data1 through Data5, can be similar to those of the reroute data object discussed above in connection with FIG. 2.

Notification request data object 500 includes flag 501. Flag 501 is denoted "H" in the figure and, when set, indicates that one or more hitless operations can be performed. Notification data object 500 (specifically, with flag 501 being set) is another example of an ARR request that can be generated (e.g., a request generated at block 302 of FIG. 5).

Figure 6:
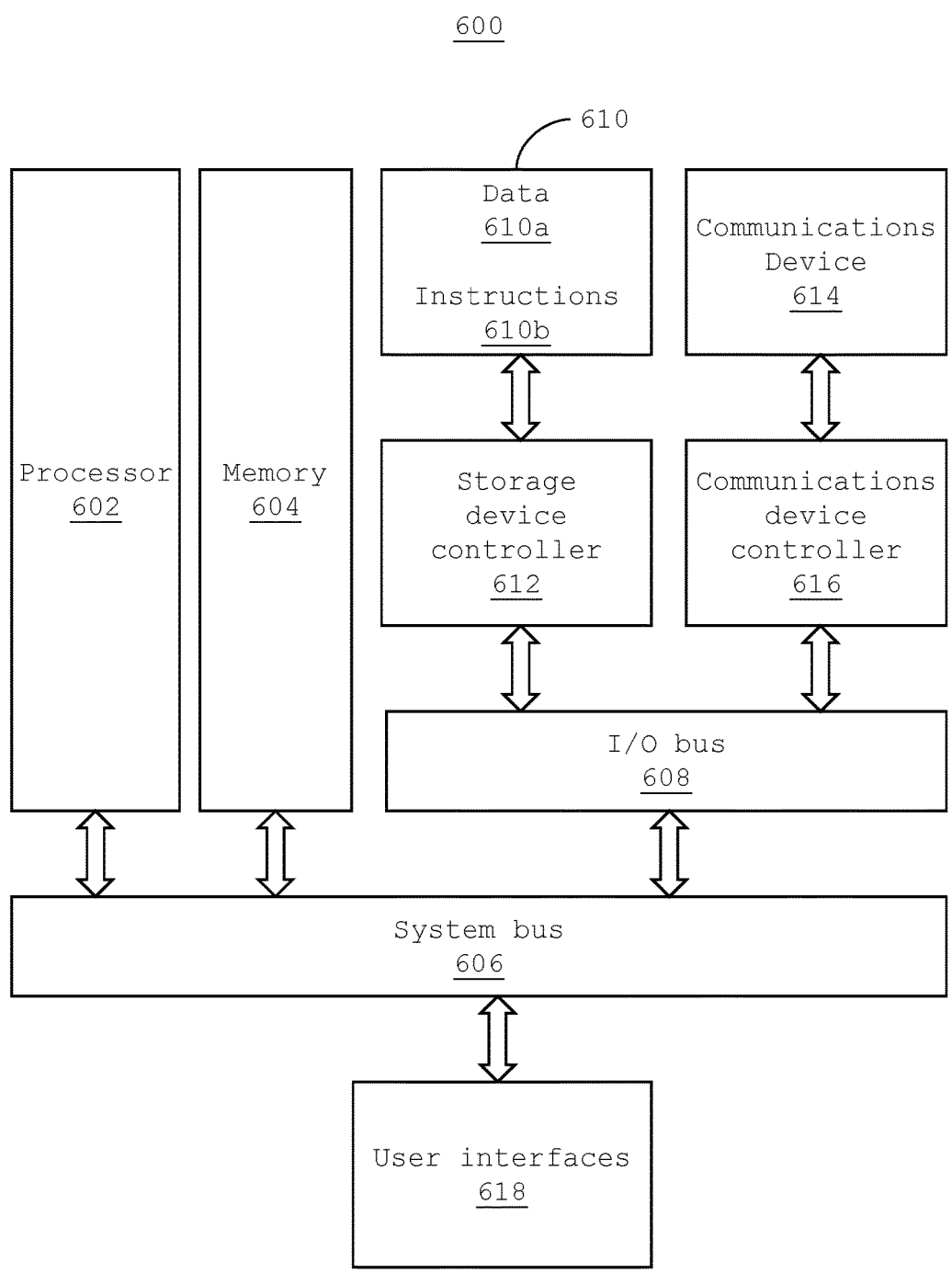
FIG. 6 is a diagram of an example data processing system.

FIG. 6 is a diagram of an example data processing system which, according to various example embodiments, can form, be incorporated in, or be a part of, for example, any component associated with the network of FIG. 1 (e.g., nodes 101, 102, and 103, and/or any component thereof) or described in the context of FIGS. 2-5. Data processing system 600 includes a processor 602 coupled to a memory 604 via a system bus 606. Processor 602 may be employed in the performance of any example embodiment herein, and any functionality described herein may be effected using a computer program having program instructions 610*b* stored in a storage device 610. The processor 602 is also coupled to external devices (not shown) via the system bus 606 and an input/output (I/O) bus 608, and at least one user interface 618. The processor 602 may be further coupled to a communications device 614 via a communications device controller 616 coupled to the I/O bus 608. The processor 602 uses the communications device 614 to communicate with a network such as, for example, optical network 100, and the communications device 614 may have one or more I/O ports. Processor 602 also can include an internal clock (not shown in FIG. 6) to keep track of time and periodic time intervals. The user interface 618 may include, for example, at least one of a keyboard, mouse, trackball, touch screen, keypad, or any other suitable user-operable input device, and at least one of a video display, speaker, printer, or any other suitable output device enabling a user to receive outputted information.

A storage device 610 having a computer-readable medium is coupled to the processor 602 via a storage device controller 612, the I/O bus 608 and the system bus 606. The storage device 610 is used by the processor 602 and storage device controller 612 to read and write data 610*a*, and to store program instructions 610*b*. Alternately, program instructions 610*b* can be stored directly in non-volatile or volatile portions of memory 604. Program instructions 610*b* can be used to implement, for example, procedures described in connection with FIGS. 3 and/or 4 in cases where system 600 is part of (or coupled to) one or more nodes of an optical network.

The storage device 610 can also store various routines and operating systems, such as Microsoft Windows, UNIX, and LINUX, or the like, that can be used by the processor 602 for controlling the operation of system 600. At least one of the operating systems stored in storage device 610 can include the TCP/IP protocol stack for implementing a known procedure for connecting to the Internet or another network, and can also include web browser software for enabling a user of the system 600 to navigate or otherwise exchange information with the World Wide Web.

In operation, the processor 602 loads the program instructions 610*b* from the storage device 610 into the memory 604. The processor 602 then executes the loaded program instructions 610*b* to perform at least part of the example procedures described herein.

By virtue of the example embodiments described herein, a hitless ARR request can be generated and processed by network elements, and if network elements involved in the ARR do not have the capability to perform data plane operations needed to carry out the ARR, a notification can be generated and transmitted to the requestor.

In the foregoing description, example aspects are described with reference to specific example embodiments. Despite these specific embodiments, many additional modifications and variations would be apparent to those skilled in the art. Thus, it is to be understood that example embodiments may be practiced in a manner otherwise than as specifically described. For example, although one or more example embodiments may have been described in the context of a network that uses RSVP and RSVP-TE protocols, it should be understood that the example embodiments are not so limited, and that in practice the example embodiments may be employed in other types of networks and/or protocols. As another example, although some example procedures for processing an ARR have been described in the context of separate origination and reroute nodes, in practice the procedures can involve origination node and the reroute node that are the same node. Similarly, while some example embodiments may process an ARR at one rerouting node, in other example embodiments there may be multiple rerouting nodes, each of which can generate ARR requests, process requests, transmit notifications, receive notifications, and/or perform ARR operations. Accordingly, the specification is to be regarded in an illustrative rather than restrictive fashion. It will be evident that modifications and changes may be made thereto without departing from the broader spirit and scope.

Similarly, it should be understood that the figures are presented solely for example purposes. The architecture of the example embodiments presented herein is sufficiently flexible and configurable such that it may be practiced (and navigated) in ways other than that shown in the accompanying figures.

Software embodiments of the example embodiments presented herein may be provided as a computer program product, or software, that may include an article of manufacture on a machine-accessible, machine-readable, or computer-readable medium having instructions. The instructions on the machine-accessible, machine-readable, or computer-readable medium may be used to program a computer system or other electronic device. The machine-readable or computer-readable medium may include, but is not limited to, floppy diskettes, optical disks, CD-ROMs, and magneto-optical disks or other type of media suitable for storing or transmitting electronic instructions. The techniques described herein are not limited to any particular software configuration. They may find applicability in any computing or processing environment. As used herein, the terms "machine-accessible medium," "machine-readable medium," or "computer-readable" shall include any medium capable of storing, encoding, or transmitting an instruction or sequence of instructions for execution by the machine such that the machine performs any one or more of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Furthermore, the purpose of the foregoing abstract is to enable the U.S. Patent and Trademark Office, the general public, and scientists, engineers, and practitioners in the art who are unfamiliar with patent or legal terms or phrases, to quickly determine from a cursory inspection the nature and essence of the technical disclosure of the application. The abstract is not intended to limit the scope of the application in any way. It is also to be understood that the processes recited in the claims need not be performed in the order presented.

What is claimed is:

1. A method for operating a network, comprising:
    identifying whether a node in the network has a capability of performing an administratively-requested reroute (ARR) without impacting network traffic, based on a result of a determination regarding whether an instruction has been issued specifying that an ARR be performed in a hitless manner;
    in a case where it is identified that the node has the capability of performing the ARR without impacting network traffic, effecting performance of an ARR operation in the network; and
    wherein the instruction includes (1) first information specifying that the ARR be performed on the network, and (2) second information specifying that the ARR be hitless.

2. The method of claim 1, further comprising providing a notification of no capability in a case where it is identified that the node does not have the capability of performing the ARR without impacting network traffic.

3. The method of claim 1, wherein the identifying identifies whether the node and at least one other node have a capability of performing the ARR without impacting network traffic.

4. The method of claim 1, wherein the node is identified to have a capability of performing the ARR without impacting network traffic in a case where the node is configured to perform hitless data plane operations.

5. The method of claim 1, wherein the method is performed by a re-route node in response to receiving the instruction from an origination node.

6. The method of claim 5, further comprising providing, to the origination node, a notification of no capability in a case where it is identified that the node does not have the capability of performing the ARR without impacting network traffic.

7. The method of claim 1, wherein the node is a reroute node and the method is performed by an origination node.

8. The method of claim 1, wherein the instruction is a Resource Reservation Protocol message.

9. The method of claim 1, wherein the instruction is a request for rerouting one or more control plane paths on the network.

10. The method of claim 1, wherein the ARR operation includes at least one of generation of a Resource Reservation Protocol (RSVP) message, transmission of a RSVP message, performance of at least one routing calculation, reservation of at least one network resource, reservation of at least one network route, or signaling at one or more nodes in the network.

11. An apparatus operating in a network, comprising:
    a memory storing a program; and
    a processor configured to operate under control of the program to perform:
        identifying whether a node in the network has a capability of performing an administratively-requested reroute (ARR) without impacting network traffic, based on a result of a determination regarding whether an instruction has been issued specifying that an ARR be performed in a hitless manner;

in a case where it is identified that the node has the capability of performing the ARR without impacting network traffic, effecting performance of an ARR operation in the network; and wherein the instruction includes (1) first information specifying that the ARR be performed on the network, and (2) second information specifying that the ARR be hitless.

12. The apparatus of claim 11, wherein the processor also operates under the control of the program to identify that the node does not have the capability of performing the ARR without impacting network traffic.

13. The apparatus of claim 11, wherein the identifying identifies whether the node and at least one other node have a capability of performing the ARR without impacting network traffic.

14. The apparatus of claim 11, wherein the node is identified to have a capability of performing the ARR without impacting network traffic in a case where the node is configured to perform hitless data plane operations.

15. The apparatus of claim 11, wherein the apparatus is a re-route node that receives the instruction from an origination node.

16. The apparatus of claim 15, wherein the processor also operates under control of the program to provide, to the origination node, a notification of no capability in a case where it is identified that the node does not have the capability of performing the ARR without impacting network traffic.

17. The apparatus of claim 11, wherein the apparatus is one of a reroute node or an origination node.

18. The apparatus of claim 11, wherein the instruction is a Resource Reservation Protocol message.

19. The apparatus method of claim 11, wherein the instruction is a request for rerouting one or more control plane paths on the network.

20. The apparatus of claim 12, wherein the ARR operation includes at least one of generation of a Resource Reservation Protocol (RSVP) message, transmission of a RSVP message, performance of at least one routing calculation, reservation of at least one network resource, reservation of at least one network route, or signaling at one or more nodes in the network.

* * * * *